(12) United States Patent
Liu

(10) Patent No.: US 11,375,128 B2
(45) Date of Patent: Jun. 28, 2022

(54) METHOD FOR OBTAINING EXPOSURE COMPENSATION VALUES OF HIGH DYNAMIC RANGE IMAGE, TERMINAL DEVICE AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Kai Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 228 days.

(21) Appl. No.: 16/828,920

(22) Filed: Mar. 24, 2020

(65) Prior Publication Data
US 2020/0228696 A1    Jul. 16, 2020

Related U.S. Application Data

(63) Continuation of application No. PCT/CN2018/108639, filed on Sep. 29, 2018.

(30) Foreign Application Priority Data

Oct. 30, 2017    (CN) .......................... 201711051871.6

(51) Int. Cl.
H04N 5/235    (2006.01)
G06T 5/00    (2006.01)
(Continued)

(52) U.S. Cl.
CPC ........... *H04N 5/2351* (2013.01); *G06T 5/009* (2013.01); *G06T 5/50* (2013.01); *H04N 5/2355* (2013.01);
(Continued)

(58) Field of Classification Search
None
See application file for complete search history.

(56) References Cited

U.S. PATENT DOCUMENTS 10,382,671 B2 *   8/2019   Imai .......................... H04N 9/69
2003/0099407 A1   5/2003   Matsushima
(Continued)

FOREIGN PATENT DOCUMENTS

CN    101873435    10/2010
CN    102075688    5/2011
(Continued)

OTHER PUBLICATIONS

EPO, Office Action for EP Application No. 18872022.1, dated Sep. 21, 2020, 8 pages.
(Continued)

*Primary Examiner* — James M Hannett
(74) *Attorney, Agent, or Firm* — Hodgson Russ LLP

(57) ABSTRACT

A method and device for obtaining exposure compensation values of a high-dynamic-range image, wherein the method includes: a relationship between brightness values and pixel ratios in different color channels corresponding to a current scene is determined; an underexposure degree and an overexposure degree of the current scene are determining, according to a preset normal exposure brightness threshold, a preset pixel ratio threshold, and the relationship between brightness values and pixel ratios; and an underexposure compensation value and an overexposure compensation value of the current scene are determined, according to the underexposure degree and the overexposure degree of the current scene.

17 Claims, 4 Drawing Sheets

(51) Int. Cl.
    *G06T 5/50*     (2006.01)
    *H04N 9/77*     (2006.01)

(52) U.S. Cl.
    CPC ..... *H04N 9/77* (2013.01); *G06T 2207/20208* (2013.01); *G06T 2207/20221* (2013.01)

(56) References Cited

U.S. PATENT DOCUMENTS

| | | | |
|---|---|---|---|
| 2007/0237392 | A1 | 10/2007 | Ohara |
| 2010/0259636 | A1* | 10/2010 | Tzur ................. H04N 5/3355 348/222.1 |
| 2013/0208139 | A1* | 8/2013 | Lin ....................... G06T 5/40 348/229.1 |
| 2013/0322753 | A1* | 12/2013 | Lim ....................... G06T 5/50 382/167 |
| 2014/0168486 | A1 | 6/2014 | Geiss |
| 2016/0037046 | A1* | 2/2016 | Nashizawa ........ H04N 5/35536 348/229.1 |
| 2017/0064179 | A1 | 3/2017 | Richards |
| 2017/0171446 | A1 | 6/2017 | Nashizawa |

FOREIGN PATENT DOCUMENTS

| | | |
|---|---|---|
| CN | 102148936 | 8/2011 |
| CN | 103248828 | 8/2013 |
| CN | 104301624 | 1/2015 |
| CN | 104580925 | 4/2015 |
| CN | 104917973 | 9/2015 |
| CN | 105227858 | 1/2016 |
| CN | 106464815 | 2/2017 |
| CN | 106572311 | 4/2017 |
| CN | 103826066 | 5/2017 |
| CN | 106791470 | 5/2017 |
| CN | 107635102 | 1/2018 |
| CN | 107888840 | 4/2018 |
| EP | 1986422 | 10/2008 |
| EP | 2763396 | 8/2014 |
| KR | 20090111065 | 10/2009 |
| KR | 20110105831 A * 9/2011 ............... G06T 5/40 |
| WO | WO-2014114223 A1 * 7/2014 ........... H04N 5/2351 |

OTHER PUBLICATIONS

IPO, Office Action, IN Application No. 202017018161, dated Apr. 29, 2021.
WIPO, ISR for PCT/CN2018/108639, Jan. 4, 2019.
SIPO, First Office Action for CN Application No. 201711051871.6, dated Jun. 4, 2019.
SIPO, Notification to Grant Patent Right for Invention for CN Application No. 201711051871.6, dated Dec. 5, 2019.

* cited by examiner

METHOD FOR OBTAINING EXPOSURE COMPENSATION VALUES OF HIGH DYNAMIC RANGE IMAGE, TERMINAL DEVICE AND NON-TRANSITORY COMPUTER-READABLE STORAGE MEDIUM

CROSS-REFERENCE TO RELATED APPLICATION

This application is a continuation of International Application No. PCT/CN2018/108639, filed Sep. 29, 2018, which claims priority to Chinese Patent Application No. 201711051871.6, filed Oct. 30, 2017, the entire disclosures of which are incorporated herein by reference.

TECHNICAL FIELD

The present disclosure relates to the field of exposure processing technologies, and in particular, to a method for obtaining exposure compensation values of a high dynamic range image, a terminal device and a non-transitory computer-readable storage medium.

BACKGROUND

Nowadays, various terminal devices have become a must-have for users' daily life, and users can perform various functions through the terminal devices. For example, a high dynamic range (HDR) image is captured using a camera in a terminal device. Among them, HDR is obtained by fusing three images of a normal exposure image, an underexposed image, and an overexposed image.

In the actual disclosure process, when the user uses the camera to take a high dynamic range image, the terminal device usually first takes a normal exposure image of the shooting area by using an Auto Exposure Control (AEC), and then according to a preset underexposed value and a preset overexposed value to capture an underexposed image and an overexposed image of the same area. The captured normal exposure image, underexposed image and overexposed image are then combined by image fusion technology to obtain a high dynamic range image.

However, due to a large difference between actual shooting environments, when shooting a high dynamic range image in the above manner, it may cause the shot image to be overexposed or underexposed, so that the final image has a low quality and effect.

SUMMARY

This disclosure is intended to address at least some of the technical deficiencies described above.

Therefore, a first object of the present disclosure is to provide a method for obtaining exposure compensation values of a high dynamic range image, which can adaptively determine the exposure compensation amount of the captured image according to different shooting scenes, so as to dynamically adjust exposure compensation of the captured image as good as possible, which improves the quality of the captured image as well as the users' experience.

A second object of the present disclosure is to provide a terminal device for obtaining exposure compensation values of a high dynamic range image.

A third object of the present disclosure is to provide a non-transitory computer-readable storage medium.

In order to achieve the above object, the method for obtaining exposure compensation values of a high dynamic range image according to an embodiment of a first aspect of the present disclosure includes: determining a relationship between brightness values and pixel ratios in different color channels corresponding to a current scene; determining an underexposure degree and an overexposure degree of the current scene, according to a preset normal exposure brightness threshold, a preset pixel ratio threshold, and the relationship between brightness values and pixel ratios; and determining an underexposure compensation value and an overexposure compensation value of the current scene, according to the underexposure degree and the overexposure degree of the current scene.

In order to achieve the above objective, a terminal device according to an embodiment of a second aspect of the present disclosure includes: a memory, a processor, and a camera module; the camera module configured to take an image of a current scene; and the memory configured to store executable program codes, the processor, configured to read executable program codes stored in the memory to execute a program corresponding to the executable program codes, thereby to implement the method for obtaining exposure compensation values of a high dynamic range image of the first aspect of the present disclosure.

In order to achieve the above object, a non-transitory computer-readable storage medium according to an embodiment of the third aspect of the present disclosure stores instructions that, upon execution on a processor, cause the processor to perform operations including: determining a number of color channels corresponding to a current scene, wherein the color channels each comprising a number of relationships between brightness values and pixel ratios; and determining an underexposure compensation value and an overexposure compensation value of the current scene, according to a preset normal exposure brightness threshold, a pixel ratio threshold, and the relationships between brightness values and pixel ratios.

A relationship between brightness values and pixel ratios in different color channels corresponding to a current scene is determined, for example, there are a number of color histograms corresponding to the current scene, wherein the color channels each includes relationship between brightness values and pixel ratios; an underexposure degree and an overexposure degree of the current scene, according to a preset normal exposure brightness threshold, a preset pixel ratio threshold, and the corresponding relationships between different brightness values and pixel ratios, are determined; an underexposure compensation value and an overexposure compensation value of the current scene, according to the underexposure degree and the overexposure degree of the current scene, are determined. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience.

The aspects and advantages of the present disclosure will be set forth in part in the description as follows or learned by practicing the disclosure.

BRIEF DESCRIPTION OF THE DRAWINGS

The above and/or additional aspects and advantages of the present disclosure will become apparent and readily understood by the description combined with the following drawings.

DETAILED DESCRIPTION

Figure 1:
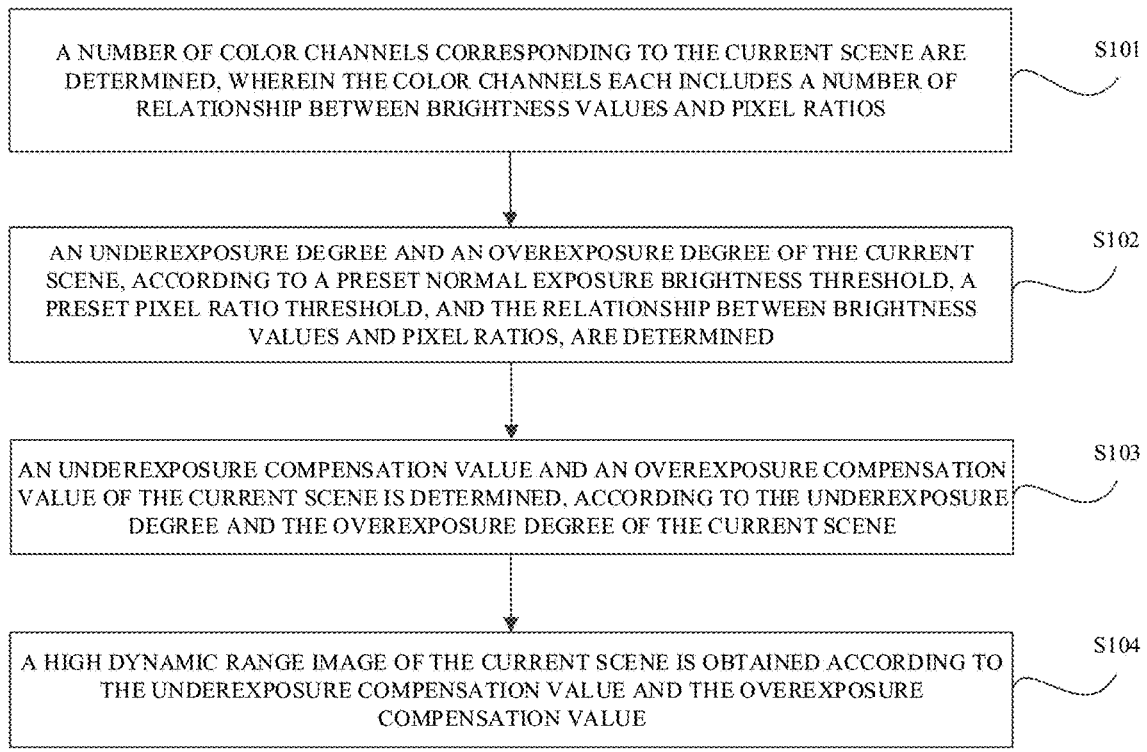
FIG. 1 is a flowchart of a method for obtaining exposure compensation values of a high dynamic range image according to an embodiment of the present disclosure.

The embodiments of the present disclosure are described in detail below, and the examples of the embodiments are illustrated in the drawings, wherein the same or similar reference numerals are used to refer to the same or similar elements or elements having the same or similar functions. The embodiments described below with reference to the accompanying drawings are intended to be illustrative and are not to be construed as limiting.

In order to solve the problem in the related art, when a camera of a terminal device is used to capture a high dynamic range image, the high dynamic range image is overexposed or underexposed, which leads to poor image quality and effect, a method for obtaining exposure compensation values of a high dynamic range image is provided.

In the method for obtaining exposure compensation values of a high dynamic range image, a number of color channels corresponding to the current scene are determined, wherein the color channels each includes relationship between brightness values and pixel ratios; an underexposure degree and an overexposure degree of the current scene, according to a preset normal exposure brightness threshold, a preset pixel ratio threshold, and the corresponding relationships between different brightness values and pixel ratios, are determined; an underexposure compensation value and an overexposure compensation value of the current scene, according to the underexposure degree and the overexposure degree of the current scene, are determined. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience.

A method for obtaining exposure compensation values of a high dynamic range image according to an embodiment of the present disclosure will be described below with reference to the drawings.

FIG. 1 is a flow chart of a method for obtaining exposure compensation values of a high dynamic range image according to an embodiment of the present disclosure.

As shown in FIG. 1, the method for obtaining exposure compensation values of a high dynamic range image of the present disclosure may include the following steps:

Step 101: a number of color channels corresponding to the current scene are determined, wherein the color channels each includes a number of relationship between brightness values and pixel ratios.

Optionally, the method for obtaining exposure compensation values of a high dynamic range image provided by the embodiment of the present disclosure may be performed by the device for obtaining exposure compensation values of a high dynamic range image provided by the disclosure, wherein the device may be configured in the terminal device to implement exposure compensation for a captured image.

The terminal device in this embodiment may be any hardware device having a camera function, such as a smart phone, a camera, a personal computer (PC), etc., which is not specifically limited in this disclosure.

As an optional implementation manner of the present disclosure, the embodiment may first obtain original image data from an image sensor. The obtained original image data may be RGB format based on a Bayer array, or may be other image data formats, such as YUV format, YCbCr format, etc., which is not specifically limited herein.

In practical use, the color channels may be acquired according to image data of RGB color histograms. In this embodiment, if the original image data are not RGB format, it is necessary to convert the non-RGB format into RGB format first.

Then, according to the image data of RGB format, a number of color histograms corresponding to the current scene are determined, which is not described in detail in this embodiment.

It should be noted that if the image data of RGB format in this embodiment includes red (R), green (G), and blue (B) color channels, the corresponding determined color channel histograms includes a red channel histogram, a green channel histogram, and a blue channel histogram.

Figure 2:
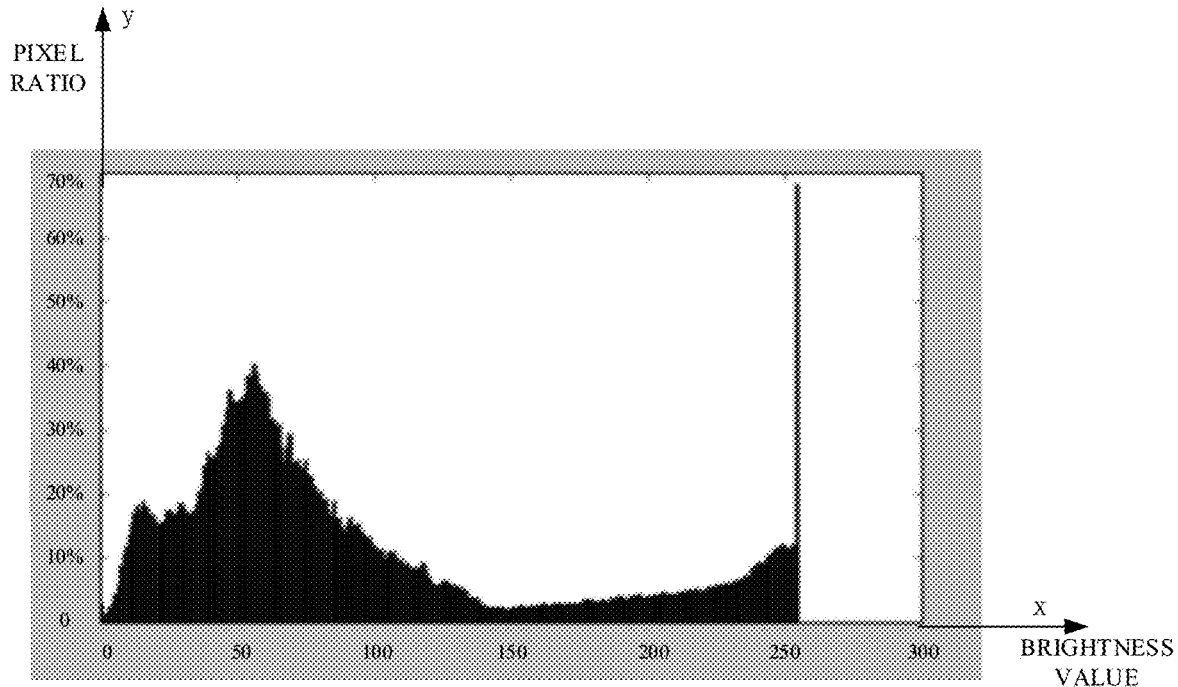
FIG. 2 is a schematic diagram of a red channel histogram according to an embodiment of the present disclosure.
Figure 3:
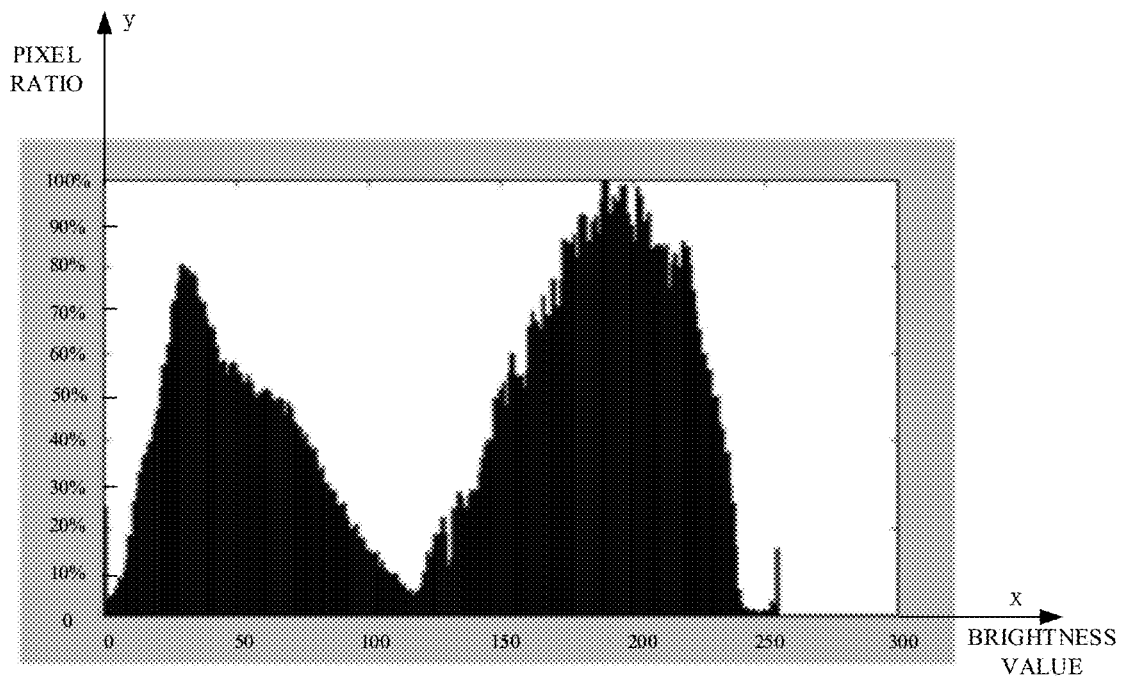
FIG. 3 is a schematic diagram of a green channel histogram according to an embodiment of the present disclosure.
Figure 4:
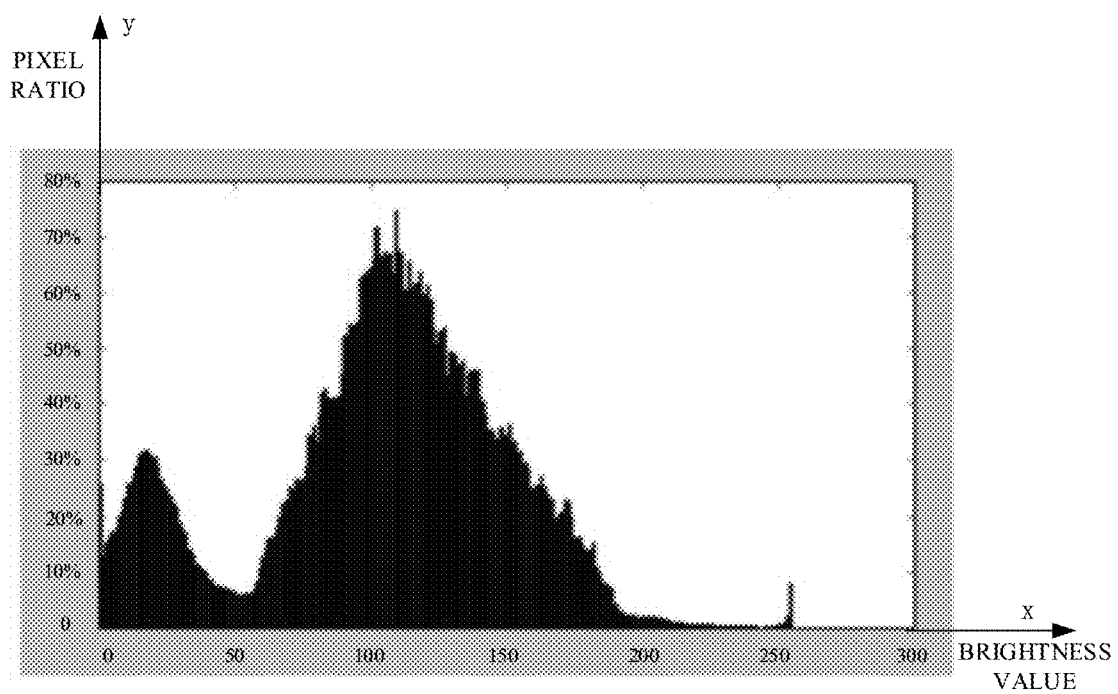
FIG. 4 is a schematic diagram of a blue channel histogram according to an embodiment of the present disclosure.

Further, the three color histograms determined above may be specifically shown in FIGS. 2-4. FIG. 2 is a red channel histogram, FIG. 3 is a green channel histogram, and FIG. 4 is a blue channel histogram. Wherein, in each color histogram, the x-axis represents the image brightness, and the y-axis represents the pixel ratio in a corresponding brightness.

If the image data of RGB format acquired in this embodiment includes four color channels, for example, a red histogram, a green (Gr) histogram, a green (Gb) histogram, and a blue histogram.

Step 102: an underexposure degree and an overexposure degree of the current scene, according to a preset normal exposure brightness threshold, a preset pixel ratio threshold, and the relationship between brightness values and pixel ratios, are determined.

Optionally, the response of the image sensor is nearly a linear relationship in practical use, if the image to be rendered is not corrected, and directly displayed on the display screen, even according to a preset normal exposure threshold to keep from overexposure, it is also possible that overexposure still occurs in the image when presented on the display screen. Therefore, in order to correctly output an image conforming to the human eyes on various devices, a correction may be required. The correction function may be a Gamma Curve of the camera.

Therefore, before implementing the step 102, a normal exposure brightness threshold may be determined according to the Gamma Curve of the camera.

Then, an underexposure degree and an overexposure degree of the current scene are determined, according to the definite normal exposure brightness threshold, a preset pixel ratio threshold, and the corresponding relationships between different brightness values and pixel ratios.

As an optional implementation manner, when determining the underexposure degree of the current scene, according to the color channels, the pixel ratios of each of the color channels are superimposed in an ascending order of brightness from low to high, for example, starting from a pixel ratio related to a brightness value of 0, and a pixel ratio related to a brightness value bigger than 0, and so on, until a superposition value of the pixel ratios reaches the pixel ratio threshold. The last superimposed brightness value can be determined when the superposition of the pixel ratios reaches the pixel ratio threshold.

After determining the last brightness value corresponding to the pixel ratio threshold, the underexposure degree of the current scene may be determined by comparing the last brightness value with the normal exposure brightness threshold.

The process of determining the overexposure degree of the current scene is similar to the process of determining the underexposure degree of the current scene. The only difference is that the pixel ratios in each of the color channels should be superimposed in descending order of brightness from high to low.

The underexposure degree and the overexposure degree may be a specific value or a range of values, and the disclosure does not specifically limit this.

Step 103: an underexposure compensation value and an overexposure compensation value of the current scene is determined, according to the underexposure degree and the overexposure degree of the current scene.

As an optional implementation manner, a difference between the underexposure degree of the current scene and the normal exposure brightness threshold can be obtained, and then the difference can be used to determine the underexposure compensation value of the current scene.

At the same time, a difference between the overexposure degree of the current scene and the normal exposure normal exposure brightness threshold can be obtained, and then the difference can be used to determine the overexposure compensation value of the current scene.

Step 104: a high dynamic range image of the current scene is obtained according to the underexposure compensation value and the overexposure compensation value.

Optionally, after the method for obtaining exposure compensations of a high dynamic range image determines the underexposure compensation value and the overexposure compensation value of the current captured image, the embodiment may obtain an underexposure image and an overexposure image of the current scene, according to the underexposure compensation value and the overexposure compensation value. The normal exposure image, the underexposed image and the overexposed image are then performed an image fusion processing to obtain a high quality high dynamic range image capable of displaying more image details.

In a specific implementation, an overexposed image of the current scene may be obtained according to the underexposure compensation value; an underexposed image of the current scene is obtained according to the overexposure compensation value; a normal exposure image of the current scene is obtained; the underexposed image, the overexposed image, and the normal exposure image are performed an image fusion processing to generates a high dynamic range image corresponding to the current scene.

It can be understood that the device for obtaining exposure compensation value of the high dynamic range image determines histograms of a number of color channels of the normal exposure image based on the normal exposure image of the current scene captured by the imaging sensor, and then according to the color channels, the normal exposure brightness value threshold, and a pixel ratio threshold adaptively determine the underexposure brightness compensation value and the overexposure brightness compensation value, so that the high dynamic range image obtained after image fusion of the underexposed image, the overexposed image and the normal exposure image can show more details of the image, more realistically reflect the true visual effect of the current scene and improve the quality of the image.

In the method for obtaining exposure compensation values of a high dynamic range image, a number of color channels corresponding to the current scene are determined, wherein the color channels each includes a number of relationship between brightness values and pixel ratios; an underexposure degree and an overexposure degree of the current scene, according to a preset normal exposure brightness threshold, a preset pixel ratio threshold, and the corresponding relationships between different brightness values and pixel ratios, are determined; an underexposure compensation value and an overexposure compensation value of the current scene, according to the underexposure degree and the overexposure degree of the current scene, are determined. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience.

Through the above analysis, it is known that the underexposure compensation value and the overexposure compensation value of the current scene are determined by determining the underexposure degree and the overexposure degree of the current scene, and according to the difference between the normal exposure brightness threshold and the underexposure degree and the difference between the normal exposure brightness threshold and the overexposure degree. Taking the process of determining the underexposure compensation value as an example, the method for obtaining exposure compensation values of a high dynamic range image of the present disclosure will be further described combined with FIG. 5.

Figure 5:
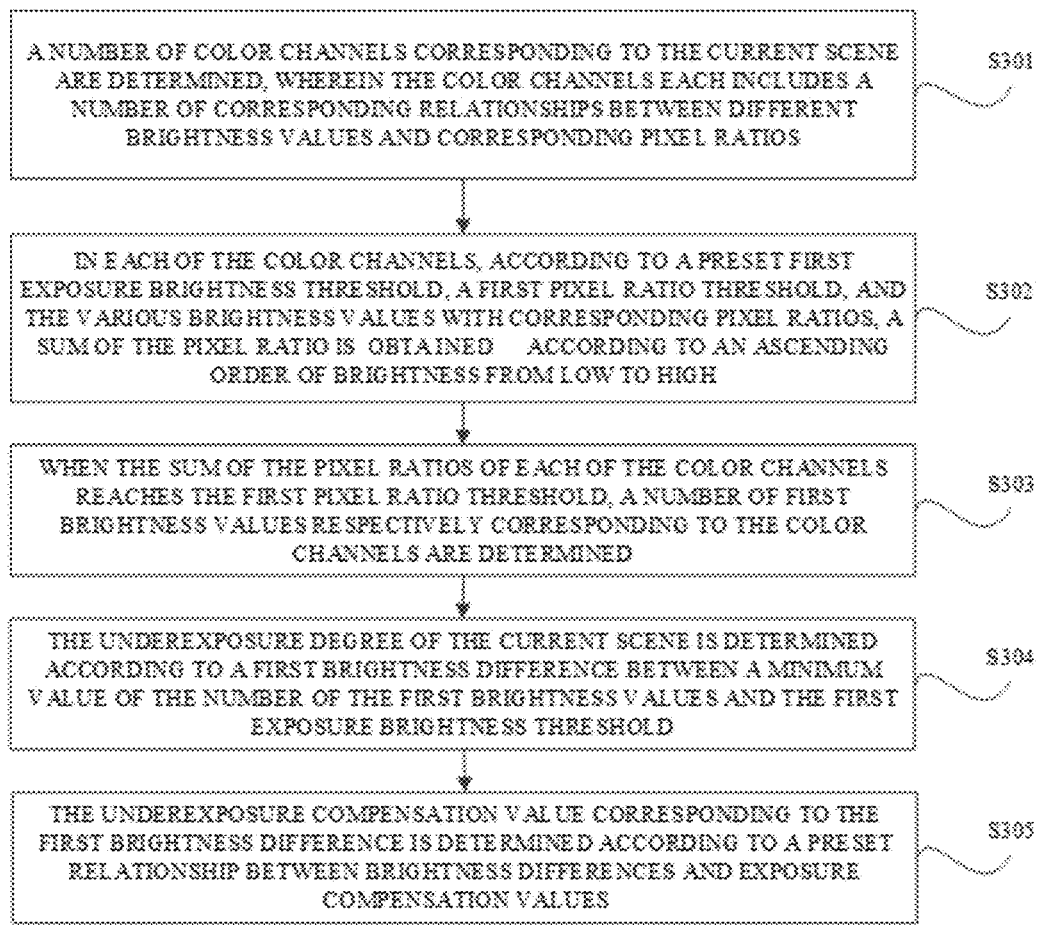
FIG. 5 is a flowchart of a method for obtaining exposure compensation values of a high dynamic range image according to another embodiment of the present disclosure.

FIG. 5 is a flow chart of another method for obtaining exposure compensation values of a high dynamic range image according to another embodiment of the present disclosure.

As shown in FIG. 5, the method for obtaining exposure compensation values of a high dynamic range image may include the following steps:

Step 301: a number of color channels corresponding to the current scene are determined, wherein the color channels each includes a number of corresponding relationships between different brightness values and corresponding pixel ratios.

Step 302: in each of the color channels, according to a preset first exposure brightness threshold, a first pixel ratio threshold, and the various brightness values with corresponding pixel ratios, a sum of the pixel ratio is obtained according to an ascending order of brightness from low to high.

Wherein, the magnitude of the first exposure brightness threshold may be determined according to a non-underexposure minimum brightness value of the image sensor; correspondingly, the magnitude of a second exposure brightness threshold for determining the degree of overexposure of each color channels may be determined according to a non-overexposure minimum brightness value of the image sensor.

Step 303: when the sum of the pixel ratios of each of the color channels reaches the first pixel ratio threshold, a number of first brightness values respectively corresponding to the color channels are determined.

Step 304: the underexposure degree of the current scene is determined according to a first brightness difference between a minimum value of the number of the first brightness values and the first exposure brightness threshold.

It should be noted that, the first brightness values of each color channels are not the same. If the underexposure degree of the current scene was determined according to a smaller bright difference, which is obtained between a larger first brightness value and the first exposure brightness threshold, the image would be also underexposure even if the image of the current scene was exposure compensated later.

Therefore, in order to effectively solve the above problem, the present disclosure determines the underexposure degree of the current scene by selecting the minimum value among the first brightness values in the color channels, thereby ensuring a more comprehensive exposure compensation of the current scene image to obtain a better image quality.

For example, the first exposure brightness threshold is 10 lux, the first pixel ratio threshold is 8%, and the color channels each is a red histogram, a channel histogram, and a blue histogram. The pixel ratios of corresponding red histogram, of corresponding green histogram, and of corresponding blue histogram are respectively superimposed in an ascending order of the brightness value from 0 to 255, until the sum of the pixel ratios of the red histogram, the green histogram, and the blue histogram, respectively, reaches the first pixel ratio threshold of 8%. Then, when the superposition of the pixel ratios reaches the first pixel ratio threshold of 8%, the first brightness value of the red histogram, the green histogram, and the blue histogram is definite, which can be 3 lux, 4 lux, and 6 lux, respectively.

The brightness value and corresponding pixel ratio may be expressed as (brightness value, pixel ratio), for example, in a red histogram, in an ascending order of brightness value from low to high, the correspondences may be (0, 1%), (1, 2%), (2, 3%), (3, 1%), (3, 3%), (5, 4%). (6, 2%) . . . . Assume that the first pixel ratio threshold is 8%. When the brightness values are added from 0 to 255, the pixel ratio 1% are added by 2%, 3%, and 1%, and the sum is 7%, which is lower than the first pixel ratio 8%. When the pixel ratio of the correspondence (3, 3%) adjacent to correspondence (3, 1%) is superposed, the sum is 10%, which is higher than the first pixel ratio 8%. The brightness value of the correspondence (3, 3%) is 3 lux, thus in the red channel, the first brightness value is 3 lux. In other color channels, there may be other first brightness values. For example, the first brightness in green histogram is 4 lux, and the first brightness in blue histogram is 6 lux.

The minimum brightness value is 3 lux in the RGB histograms, thus the difference between the first exposure brightness threshold and the first brightness values is 7 lux. Therefore, the difference 7 lux may be determined to be the underexposure degree of the current scene.

Step 305: the underexposure compensation value corresponding to the first brightness difference is determined according to a preset relationship between brightness differences and exposure compensation values.

The relationship between the brightness differences and the exposure compensation values may be preset according to different shooting scenes, which is not specifically limited in this disclosure.

That is, after determining the underexposure degree of the current scene, a query may be performed in a relationship list showing a correspondence between the brightness differences and the exposure compensation values according to the underexposure degree to determine the underexposure compensation value corresponding to the first brightness difference.

In the method for obtaining exposure compensation values of a high dynamic range image, the underexposure degree of the current scene is determined according to a first exposure brightness threshold, a first pixel ratio threshold, and the relationship between brightness values and pixel ratios, and then the corresponding exposure compensation value is determined according to the preset relationship list showing a correspondence between the brightness differences and the exposure compensation values. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience.

In order to implement the above embodiment, the present disclosure also provide a device for obtaining exposure compensation values of a high dynamic range image.

Figure 6:
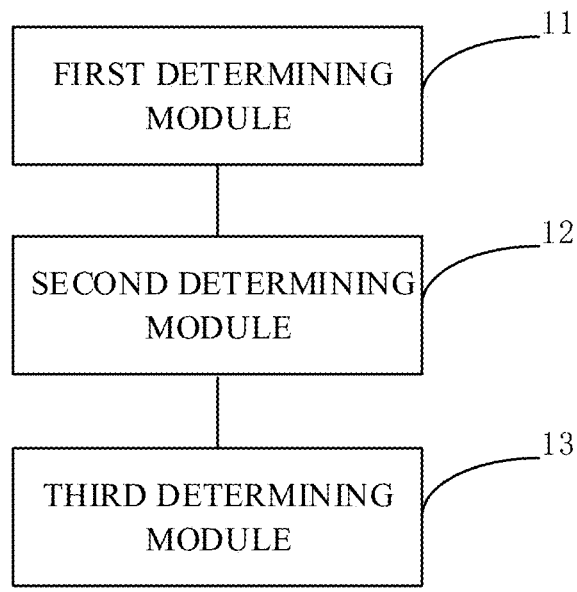
FIG. 6 is a schematic structural diagram of a device for obtaining exposure compensation values of a high dynamic range image according to an embodiment of the present disclosure.

FIG. 6 is a schematic structural diagram of a device for obtaining exposure compensation values of a high dynamic range image according to an embodiment of the present disclosure.

As shown in FIG. 6, the device for obtaining exposure compensation values of a high dynamic range image includes: a first determining module 11, a second determining module 12, and a third determining module 13.

The first determining module 11 is configured to determine a number of color channels corresponding to the current scene, wherein the color channels each includes a number of relationship between brightness values and pixel ratios;

The second determining module 12 is configured to determine an underexposure degree and an overexposure degree of the current scene, according to a preset normal exposure brightness threshold, a preset pixel ratio threshold, and the relationship between brightness values and pixel ratios; the third determining module 13 is configured to determine an underexposure compensation value and an overexposure compensation value of the current scene, according to the underexposure degree and the overexposure degree of the current scene.

In another embodiment of the present disclosure, the preset normal exposure brightness threshold preset in the present disclosure includes: first exposure brightness threshold, a first pixel ratio threshold including a first pixel ratio threshold.

The second determining module 12 of the present disclosure includes: an obtaining unit, configured to, in each of the color channels, obtain a sum of the pixel ratio according to an ascending order of brightness from low to high; a first determining unit, configured to determine a number of first brightness values respectively corresponding to the color channels, when the sum of the pixel ratios of each of the color channels reaches the first pixel ratio threshold; and a second determining unit, configured to determine the underexposure degree of the current scene according to a first brightness difference between a minimum value of the number of the first brightness values and the first exposure brightness threshold.

In another embodiment of the present disclosure, the third determining module is configured to:

determine the underexposure compensation value corresponding to the first brightness difference according to a preset relationship between brightness differences and exposure compensation values. In another embodiment of the present disclosure, the embodiment of the present disclosure further includes: an obtaining module.

The obtaining module is configured to obtain a high dynamic range image of the current scene according to the underexposure compensation value and the overexposure compensation value.

In another embodiment of the present disclosure, the obtaining module includes: a first obtaining subunit, configured to obtain an overexposed image of the current scene according to the underexposure compensation value; a second acquiring subunit, configured to obtain an underexposed image of the current scene according to the overexposure compensation value; a third acquiring subunit, configured to obtain a normal exposure image of the current scene; a generating subunit, configured to generate a high dynamic range image corresponding to the current scene by fusing the underexposed image, the overexposed image, and the normal exposure image.

In another embodiment of the present disclosure, the embodiment of the present disclosure further includes: a fourth determining module.

The fourth determining module is configured to determine the normal exposure brightness threshold according to the Gamma Curve of the camera.

It should be noted that the foregoing explanation of the embodiment of the method for obtaining exposure compensations of a high dynamic range image is also applicable to the device for obtaining exposure compensations of a high dynamic range image, and the implementation principle thereof is similar, and details are not described herein again.

In the device for obtaining exposure compensation values of a high dynamic range image, a number of color channels corresponding to the current scene are determined, wherein the color channels each includes a number of relationship between brightness values and pixel ratios; an underexposure degree and an overexposure degree of the current scene, according to a preset normal exposure brightness threshold, a preset pixel ratio threshold, and the relationship between brightness values and pixel ratios, are determined; an underexposure compensation value and an overexposure compensation value of the current scene, according to the underexposure degree and the overexposure degree of the current scene, are determined. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience. In order to implement the above embodiments, the present disclosure also proposes a terminal device.

Figure 7:
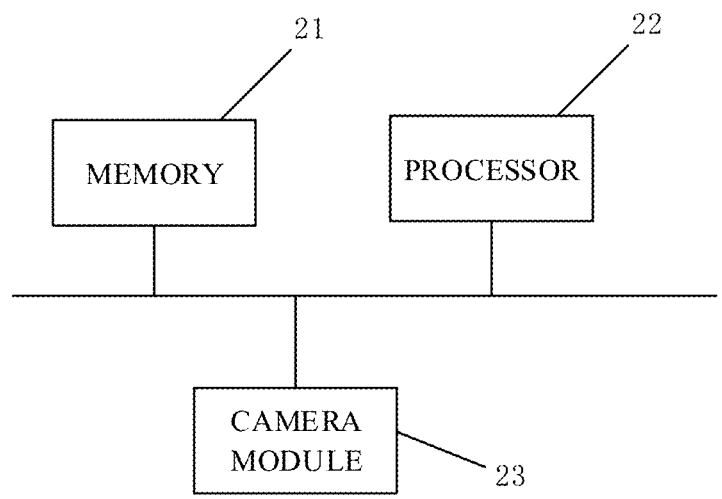
FIG. 7 is a schematic structural diagram of a terminal device according to an embodiment of the present disclosure.

FIG. 7 is a schematic structural diagram of a terminal device according to an embodiment of the present disclosure.

Referring to FIG. 7, the terminal device for the present disclosure includes a memory 21, a processor 22, and a camera module 23.

The camera module 23 is configured to take an image in a current scene.

The memory 21 is configured to store executable program code.

The processor 22 is configured to read the executable program code stored in the memory 21 to execute a program corresponding to the executable program code, to perform the method for obtaining exposure compensation values of a high dynamic range image of the first aspect of the present disclosure. The method for obtaining exposure compensation values of a high dynamic range image includes: determining a number of color channels corresponding to the current scene, wherein the color channels each includes a number of relationship between brightness values and pixel ratios; determining an underexposure degree and an overexposure degree of the current scene, according to a preset normal exposure brightness threshold, a preset pixel ratio threshold, and the relationship between brightness values and pixel ratios; determining an underexposure compensation value and an overexposure compensation value of the current scene, according to the underexposure degree and the overexposure degree of the current scene.

The terminal device in this embodiment may be any hardware device having a camera function, such as a smart phone, a camera, a personal computer (PC), etc., which is not specifically limited in this disclosure.

It should be noted that the foregoing explanation of the embodiment of the method for obtaining exposure compensations of a high dynamic range image is also applicable to the terminal device, and the implementation principle thereof is similar, and details are not described herein again.

In the terminal device, a number of color channels corresponding to the current scene are determined, wherein the color channels each includes a number of relationship between brightness values and pixel ratios; an underexposure degree and an overexposure degree of the current scene, according to a preset normal exposure brightness threshold, a preset pixel ratio threshold, and the relationship between brightness values and pixel ratios, are determined; an underexposure compensation value and an overexposure compensation value of the current scene, according to the underexposure degree and the overexposure degree of the current scene, are determined. Therefore, when exposure compensation is performed on the captured image, it is possible to adaptively determine the exposure compensation amount of the captured image according to different shooting scenes, so as to dynamically adjust exposure compensation as good as possible for the captured image, thereby enabling the captured image to be more clearly display the details of the image, and more realistically reflect a real visual effect of the current scene, improving the quality of the image, as well as the users' experience.

In order to implement the above embodiments, the present disclosure also proposes a non-transitory computer-readable storage medium.

The non-transitory computer-readable storage medium having stored instructions that, upon execution on a processor, cause the processor to perform the method for obtaining exposure compensation values of a high dynamic range image. The method for obtaining exposure compensation values of a high dynamic range image includes: determining a number of color channels corresponding to the current scene, wherein the color channels each includes a number of relationship between brightness values and pixel ratios; determining an underexposure degree and an overexposure degree of the current scene, according to a preset normal exposure brightness threshold, a preset pixel ratio threshold, and the relationship between brightness values and pixel ratios; determining an underexposure compensation value and an overexposure compensation value of the current scene, according to the underexposure degree and the overexposure degree of the current scene.

In order to implement the above embodiments, the present disclosure also proposes a computer program. When the computer program is executed by the processor, the processor is caused to implement the method for obtaining exposure compensation values of a high dynamic range image of the present disclosure.

In the present disclosure, the terms "set", "connected" and the like shall be understood broadly, and may be either mechanical or electrical, as may be directly connected or passed through, unless otherwise specifically defined and defined. The intermediate medium is indirectly connected and may be an internal connection of two elements or an interaction of two elements unless explicitly defined otherwise. For those skilled in the art, the specific meanings of the above terms in the present disclosure can be understood on a case-by-case basis.

In the description of the present specification, the description with reference to the terms "one embodiment", "some embodiments", "example", "specific example", or "some examples" and the like means a specific feature described in connection with the embodiment or example. A structure, material or feature is included in at least one embodiment or example of the disclosure.

Moreover, the terms "first" and "second" are used for descriptive purposes only and are not to be construed as indicating or implying a relative importance or implicitly indicating the number of technical features indicated. Thus, features defining "first" or "second" may include at least one of the features, either explicitly or implicitly.

Any process or method description in the flowcharts or otherwise described herein may be understood to represent a module, segment or portion of code that includes one or more executable instructions for implementing the steps of a particular logical function or process. And the scope of the preferred embodiments of the present disclosure includes additional implementations, in which the functions may be performed in a substantially simultaneous manner or in the reverse order depending on the functions involved, in accordance with the illustrated or discussed order. It will be understood by those skilled in the art to which the embodiments of the present disclosure pertain.

It should be understood that portions of the disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented by any one or combination of the following techniques well known in the art: discrete logic circuits having logic gates for implementing logic functions on data signals, specific integrated circuits with suitable combinational logic gates, programmable gate arrays (PGAs), or field programmable gate arrays (FPGAs), etc.

One of ordinary skill in the art can understand that all or part of the steps carried by the method for implementing the above embodiments can be completed by a program to instruct related hardware, and the program can be stored in a computer readable storage medium. When executed, one or a combination of the steps of the method embodiments is included.

The above-mentioned storage medium may be a read only memory, a magnetic disk or an optical disk or the like. While the embodiments of the present disclosure have been shown and described above, it is understood that the above-described embodiments are illustrative and are not to be construed as limiting the scope of the present disclosure. The embodiments are subject to variations, modifications, substitutions and variations.

What is claimed is:

1. A method for obtaining exposure compensation values of a high dynamic range image, comprising:
   determining a relationship between brightness values and pixel ratios in different color channels corresponding to a current scene;
   determining an underexposure degree and an overexposure degree of the current scene, according to a preset normal exposure brightness threshold, a preset pixel ratio threshold, and the relationship between brightness values and pixel ratios; and
   determining an underexposure compensation value and an overexposure compensation value of the current scene, according to the underexposure degree and the overexposure degree of the current scene;
   wherein the normal exposure brightness threshold comprises a first exposure brightness threshold; the pixel ratio threshold comprises a first pixel ratio threshold;
   wherein determining the underexposure degree of the current scene comprises:
   in each of the color channels, obtaining a sum of the pixel ratios according to an ascending order of brightness from low to high;
   when the sum of the pixel ratios of each of the color channels reaches the first pixel ratio threshold, determining a plurality of first brightness values respectively corresponding to the color channels; and
   determining the underexposure degree of the current scene according to a first brightness difference between a minimum value of the first brightness values and the first exposure brightness threshold.

2. The method of claim 1, wherein determining the underexposure compensation value of the current scene comprises:
   determining the underexposure compensation value corresponding to the first brightness difference according to a preset relationship between brightness differences and exposure compensation values.

3. The method of claim 1, wherein the first brightness values are correspondent to a pixel ratio of each of the color channels that renders the sum of the pixel ratios to be equal to or greater than the first pixel ratio threshold.

4. The method of claim 1, wherein after determining an underexposure compensation value and an overexposure compensation value of the current scene, the method further comprising:
obtaining a high dynamic range image of the current scene according to the underexposure compensation value and the overexposure compensation value.

5. The method of claim 4, wherein obtaining a high dynamic range image of the current scene according to the underexposure compensation value and the overexposure compensation value comprises:
obtaining an overexposed image of the current scene according to the underexposure compensation value;
obtaining an underexposed image of the current scene according to the overexposure compensation value;
obtaining a normal exposure image of the current scene; and
generating the high dynamic range image corresponding to the current scene by performing an image fusion processing on the underexposed image, the overexposed image, and the normal exposure image.

6. The method of claim 1, before determining the underexposure degree and the overexposure degree of the current scene, the method further comprising:
determining the normal exposure brightness threshold according to a Gamma Curve of a camera.

7. The method of claim 1, wherein; the pixel ratio threshold comprises a second pixel ratio threshold;
determining the overexposure compensation degree of the current scene comprising:
obtaining a sum of the pixel ratios in each of the color channels according to a descending order of brightness from high to low;
when the sum of the pixel ratios of each of the color channels reaches the second pixel ratio threshold, determining a plurality of second brightness values respectively corresponding to the color channels; and
determining the overexposure degree of the current scene according to a second brightness difference between a maximum value of the second brightness values and the first exposure brightness threshold.

8. The method of claim 1, wherein the color channels are respectively corresponding to a red channel, a green channel, and a blue channel.

9. A terminal device, comprising:
a memory, a processor, and a camera module;
wherein the camera module is configured to take an image of a current scene;
wherein the memory is configured to store executable instructions, which when executed by the processor cause the terminal device to:
determine a relationship between brightness values and pixel ratios in different color channels corresponding to a current scene;
determine an underexposure degree and an overexposure degree of the current scene, according to a corrected normal exposure brightness threshold, a preset pixel ratio threshold, and the relationship between brightness values and pixel ratios; and
determine an underexposure compensation value and an overexposure compensation value of the current scene, according to the underexposure degree and the overexposure degree of the current scene;
wherein the normal exposure brightness threshold comprises a first exposure brightness threshold;
wherein the pixel ratio threshold comprises a first pixel ratio threshold;
wherein determining the overexposure degree of the current scene comprises:
obtaining a sum of the pixel ratios in each of the color channels according to a descending order of brightness from high to low;
when the sum of the pixel ratios of each of the color channels reaches the first pixel ratio threshold, determining a plurality of first brightness values respectively corresponding to the color channels; and
determining the overexposure degree of the current scene according to a first brightness difference between a maximum value of the first brightness values and the first exposure brightness threshold.

10. The terminal device of claim 9, wherein the pixel ratio threshold comprising a second pixel ratio threshold; determining an underexposure degree and an overexposure degree of the current scene comprises:
in each of the color channels, obtaining a sum of the pixel ratio according to an ascending order of brightness from low to high;
determining a plurality of second brightness values respectively corresponding to the color channels, when the sum of the pixel ratios of each of the color channels reaches the second pixel ratio threshold; and
determining the underexposure degree of the current scene according to a second brightness difference between a minimum value of the second brightness values and the first exposure brightness threshold.

11. The terminal device of claim 10, wherein determining an underexposure compensation value and an overexposure compensation value of the current scene comprises:
determining the underexposure compensation value corresponding to the second brightness difference according to a preset relationship between brightness differences and exposure compensation values.

12. The terminal device of claim 10, wherein the second brightness values are correspondent to a pixel ratio of each of the color channels that renders the sum of the pixel ratios to be equal to or greater than the second pixel ratio threshold.

13. The terminal device of claim 9, wherein the memory is further configured to store executable instructions, which when executed by the processor cause the terminal device to:
obtain a high dynamic range image of the current scene according to the underexposure compensation value and the overexposure compensation value.

14. The terminal device of claim 13, wherein obtaining the high dynamic range image of the current scene comprises:
obtaining an overexposed image of the current scene according to the underexposure compensation value;
obtaining an underexposed image of the current scene according to the overexposure compensation value;
obtaining a normal exposure image of the current scene; and
generating a high dynamic range image corresponding to the current scene by performing an image fusion processing on the underexposed image, the overexposed image, and the normal exposure image.

15. The terminal device of claim 9, wherein the memory is further configured to store executable instructions, which when executed by the processor cause the terminal device to:
  correct a normal exposure brightness threshold to obtain the normal exposure brightness threshold according to a Gamma Curve of a camera.

16. The terminal device of claim 9, wherein the color channels respectively correspond to a red channel, a green channel, and a blue channel.

17. A non-transitory computer-readable storage medium storing instructions that, upon execution by a processor, cause the processor to perform operations comprising:
  determining a plurality of color channels corresponding to a current scene, wherein the color channels each comprising a plurality of relationships between brightness values and pixel ratios; and
  determining an underexposure compensation value and an overexposure compensation value of the current scene, according to a preset normal exposure brightness threshold, a pixel ratio threshold, and the relationships between brightness values and pixel ratios;
wherein determining an underexposure compensation value and an overexposure compensation value of the current scene, according to a preset normal exposure brightness threshold, a pixel ratio threshold, and the relationships between brightness values and pixel ratios, comprises:
  obtaining a minimum value of the brightness values of the color channels corresponding to a last pixel ratio to be superimposed, which renders a sum of the pixel ratios reach the pixel ratio threshold, and
  determining the underexposure compensation value, according to a difference between the minimum value of the brightness values and the preset normal exposure brightness threshold.

* * * * *